(12) United States Patent
Gausmann

(10) Patent No.: US 11,674,600 B2
(45) Date of Patent: Jun. 13, 2023

(54) ASSEMBLY, MORE PARTICULARLY TURBOMACHINE, COMPRISING A SHAFT SEAL DEVICE

(71) Applicant: Siemens Energy Global GmbH & Co. KG, Munich (DE)

(72) Inventor: Rainer Gausmann, Duisburg (DE)

(73) Assignee: Siemens Energy Global GmbH & Co., KG, Munich (DE)

( * ) Notice: Subject to any disclaimer, the term of this patent is extended or adjusted under 35 U.S.C. 154(b) by 205 days.

(21) Appl. No.: 17/057,655

(22) PCT Filed: Apr. 29, 2019

(86) PCT No.: PCT/EP2019/060876
§ 371 (c)(1),
(2) Date: Nov. 21, 2020

(87) PCT Pub. No.: WO2019/228729
PCT Pub. Date: Dec. 5, 2019

(65) Prior Publication Data
US 2021/0199198 A1    Jul. 1, 2021

(30) Foreign Application Priority Data
May 30, 2018    (EP) .................................. 18175111

(51) Int. Cl.
*F16J 15/43*    (2006.01)
*F01D 11/04*    (2006.01)
*F16J 15/447*    (2006.01)

(52) U.S. Cl.
CPC ............... *F16J 15/43* (2013.01); *F01D 11/04* (2013.01); *F16J 15/447* (2013.01); *F05D 2240/55* (2013.01)

(58) Field of Classification Search
CPC .......... F16J 15/43; F16J 15/447; F16J 15/328; F01D 11/04; F05D 2240/55
See application file for complete search history.

(56) References Cited

U.S. PATENT DOCUMENTS 4,380,356 A * 4/1983 Weghaupt .............. H02K 55/04
277/913
4,407,518 A * 10/1983 Moskowitz .............. F16J 15/43
277/928

(Continued)

FOREIGN PATENT DOCUMENTS

| AU | 505154 B2 | 11/1979 |
|----|----|----|
| CN | 102182830 A | 9/2011 |

(Continued)

OTHER PUBLICATIONS

PCT International Search Report and Written Opinion of International Searching Authority dated Jul. 18, 2019 corresponding to PCT International Application No. PCT/EP2019/060876 filed Apr. 29, 2019.

*Primary Examiner* — Vishal A Patel
(74) *Attorney, Agent, or Firm* — Wolter Van Dyke Davis, PLLC

(57) ABSTRACT

An assembly, more particularly a turbomachine, includes a shaft, which extends along an axis, a shaft seal device for sealing an annular gap between the shaft and a stator in order to seal a process fluid chamber in relation to the environment. The shaft seal device has a ferrofluid shaft seal. At the process fluid chamber, the shaft seal device includes, in addition to the ferrofluid shaft seal, an additional shaft seal. The ferrofluid shaft seal is arranged at the annular gap axially between the first shaft seal and the environment. A pressure sink is provided at the annular gap axially between the additional shaft seal and the ferrofluid shaft seal.

6 Claims, 3 Drawing Sheets

(56) References Cited

U.S. PATENT DOCUMENTS

| | | | | |
|---|---|---|---|---|
| 4,526,379 A | * | 7/1985 | Raj | F16J 15/43 277/410 |
| 4,527,802 A | * | 7/1985 | Wilcock | F16J 15/43 310/90.5 |
| 4,671,677 A | * | 6/1987 | Heshmat | F16J 15/42 277/410 |
| 4,671,679 A | * | 6/1987 | Heshmat | F16J 15/43 384/100 |
| 4,797,013 A | | 1/1989 | Raj et al. | |
| 4,865,334 A | * | 9/1989 | Raj | F16J 15/43 277/410 |
| 5,007,513 A | * | 4/1991 | Carlson | F16J 15/43 252/62.52 |
| 5,799,951 A | * | 9/1998 | Anderson | F16J 15/43 277/304 |
| 5,828,795 A | * | 10/1998 | Miyakoshi | F16C 33/1035 277/501 |
| 8,734,147 B2 | * | 5/2014 | Katsumata | F27B 17/0016 277/362 |
| 10,344,608 B2 | * | 7/2019 | Gaia | F01D 25/12 |

FOREIGN PATENT DOCUMENTS

| | | |
|---|---|---|
| CN | 104948743 A | 9/2015 |
| CN | 106678372 A | 5/2017 |
| CN | 207111942 U | 3/2018 |
| JP | S59144261 U | 8/1984 |
| JP | S6272966 A | 4/1987 |
| JP | S62177368 A | 8/1987 |
| RU | 2302573 C2 | 7/2007 |
| SU | 1093850 A1 | 5/1984 |
| WO | 1992013216 A1 | 8/1992 |
| WO | 2014146956 A1 | 9/2014 |

* cited by examiner

ASSEMBLY, MORE PARTICULARLY TURBOMACHINE, COMPRISING A SHAFT SEAL DEVICE

CROSS REFERENCE TO RELATED APPLICATIONS

This application is the US National Stage of International Application No. PCT/EP2019/060876 filed 29 Apr. 2019, and claims the benefit thereof. The International Application claims the benefit of European Application No. EP18175111 filed 30 May 2018. All of the applications are incorporated by reference herein in their entirety.

FIELD OF INVENTION

The invention relates to an assembly, more particularly a turbomachine, comprising—a shaft, which extends along an axis, —a shaft seal device for sealing an annular gap between the shaft and a stator in order to seal a process fluid chamber in relation to the environment, —wherein the shaft seal device has a ferrofluid shaft seal, wherein, at the process fluid chamber, the shaft seal device comprises an additional shaft seal in addition to the ferrofluid shaft seal, —wherein the ferrofluid shaft seal is arranged at the annular gap axially between the first shaft seal and the environment, wherein a pressure sink is provided at the annular gap axially between the additional shaft seal and the ferrofluid shaft seal.

BACKGROUND OF INVENTION

An assembly of this type comprising a shaft seal device is already known from WO 2014/146956 A1.

From WO 92/13216 it is also already known—that at the process fluid chamber, the shaft seal device comprises an additional shaft seal in addition to the ferrofluid shaft seal, —wherein the ferrofluid shaft seal is arranged at the annular gap axially between the first shaft seal and the environment, —wherein a pressure sink is provided at the annular gap axially between the additional shaft seal and the ferrofluid shaft seal.

If process fluids flow through turbomachines, it is generally necessary to transfer mechanical power out of a chamber filled with the process fluid into the environment by means of a shaft. In order to delimit the chamber filled with the process fluid relative to the environment, a stator or a housing or pressure container is provided which, in the region of the shaft bushing, has a shaft seal which seals the gap between the shaft and the stator. The shaft seal device is a key component since, even at high rotational speeds, an only minimal leakage—to some extent as far as complete tightness—is desired. One exception to the principle described is represented by a turbomachine comprising an integrated motor or generator, so that the fluidic work can be transmitted directly as electrical power beyond the stator boundary. Assemblies of this type are comparatively costly and are therefore frequently not economically successful. In particular in the case of dangerous, for example toxic, fluids, secure leakage-free sealing of the turbomachine is essential. Liquid-lubricated seals regularly approximately satisfy requirements of this type, wherein a leakage of barrier fluid which always arises has to be compensated, for example by the process fluid flowing past. The replenishment of suitable barrier fluid is complicated and costly and is therefore not desired by the customer or is to be kept at a minimum. One possible way of minimizing the loss of barrier fluid consists in the use of a ferrofluid seal, which effectively brings about a reduction of the ferrofluid by process fluid flowing past as a result of the additionally applied magnetic forces. One disadvantage of the ferrofluid seal is, however, that the pressure differences occurring in turbomachines are regularly too high.

SUMMARY OF INVENTION

Starting from the problems and disadvantages of the prior art, the object of the invention is to provide a shaft seal device for a turbomachine which exhibits very low—advantageously virtually even no—leakage with, at the same time, relatively low operating costs.

To achieve the object, according to the invention an assembly of the type defined at the beginning having the additional features of the characterizing clause of the main claim is proposed.

By means of the combination according to the invention of ferrofluid shaft seal and additional shaft seal and the pressure sink located between them, the invention achieves the possibility of using the ferrofluid shaft seal even, for example, on turbomachines with high maximum pressures and, in this way, of devising an alternative to hermetic assemblies without shaft seals. Here, the invention succeeds not just in achieving suitability for high absolute pressures in the turbomachine of the assembly but also an increased level of safety, in that in particular a tried and tested and failsafe construction can be used as an additional shaft seal. Here, in particular the use of a labyrinth seal is advisable which, as a result of simplicity, offers a maximum level of operating reliability. In particular, such an additional shaft seal can be designed independently of auxiliary energy supplies. In this sense, the ferrofluid shaft seal is advantageously magnetized by means of a permanent magnet, so that, in this way, independence from auxiliary energy is provided.

Advantageously, the ferrofluid shaft seal has a ferrofluid in which particles of iron and/or magnetite and/or cobalt suspended colloidally in a carrier liquid are provided. Alternatively or additionally, the ferrofluid can be formed as an ionic liquid, wherein the ions, cations or anions in the solution behave magnetically. Various possibilities known in the prior art are suitable as carrier liquid, for example hydrocarbons or oils or water.

Particularly expediently, the assembly has a ferrofluid storage container, in which ferrofluid is stored. Said ferrofluid storage container is connected to lines to the supply or discharge of the ferrofluid relative to the ferrofluid seal. In this way, losses of ferrofluid in the area of the ferrofluid seal can be compensated and conditioning of the ferrofluid can be carried out, so that any contaminants or other changes in the ferrofluid can be reversed. In addition, conditioning in the sense of cooling the ferrofluid under elevated frictional losses, which cannot be dissipated by means of simple convention or thermal conduction, is expedient. Advantageously attached to the ferrofluid storage container here is filtering and/or separation for contaminants of the ferrofluid, cooling or temperature control and/or a pump, which brings the ferrofluid to the necessary supply pressure.

Particularly expedient is a design of the ferrofluid seal and of the bearing as a combined component, wherein the ferrofluid for the bearing is advantageously provided as a lubricant. The design as a combined component means that at least one extension of the area of the shaft which serves for the mounting is also at the same time the area on which the ferrofluid seal seals. Here, it is in principle also conceivable for the bearing to be an axial bearing and for the ferrofluid seal to seal a gap extending in the axial direction. A combination of the ferrofluid seal and of the bearing which supports the shaft by means of a lubricating film is also already present in the sense of this invention when the ferrofluid storage container is at the same time also the storage container for the lubricant of the bearing and/or the ferrofluid is at the same time a barrier medium for the shaft seal and a lubricant for the bearing. Here, it is expedient if a conditioning unit which is connected to the ferrofluid container has a pump, which provides a supply pressure for the ferrofluid seal and the supply of the ferrofluid to the bearing as lubricant. Here, it is expedient if the ferrofluid is supplied to the ferrofluid seal at a first pressure, and the ferrofluid is supplied to the bearing as lubricant at a second pressure, which is advantageously different from the first pressure. These different pressures can be produced either by means of two different pumps or advantageously by means of at least one advantageously adjustable throttle in at least one supply line to the bearing and/or the ferrofluid seal.

BRIEF DESCRIPTION OF THE DRAWINGS

The invention is explained in more detail below by using a specific exemplary embodiment and with reference to drawings, in which.

DETAILED DESCRIPTION OF INVENTION

Figure 1:
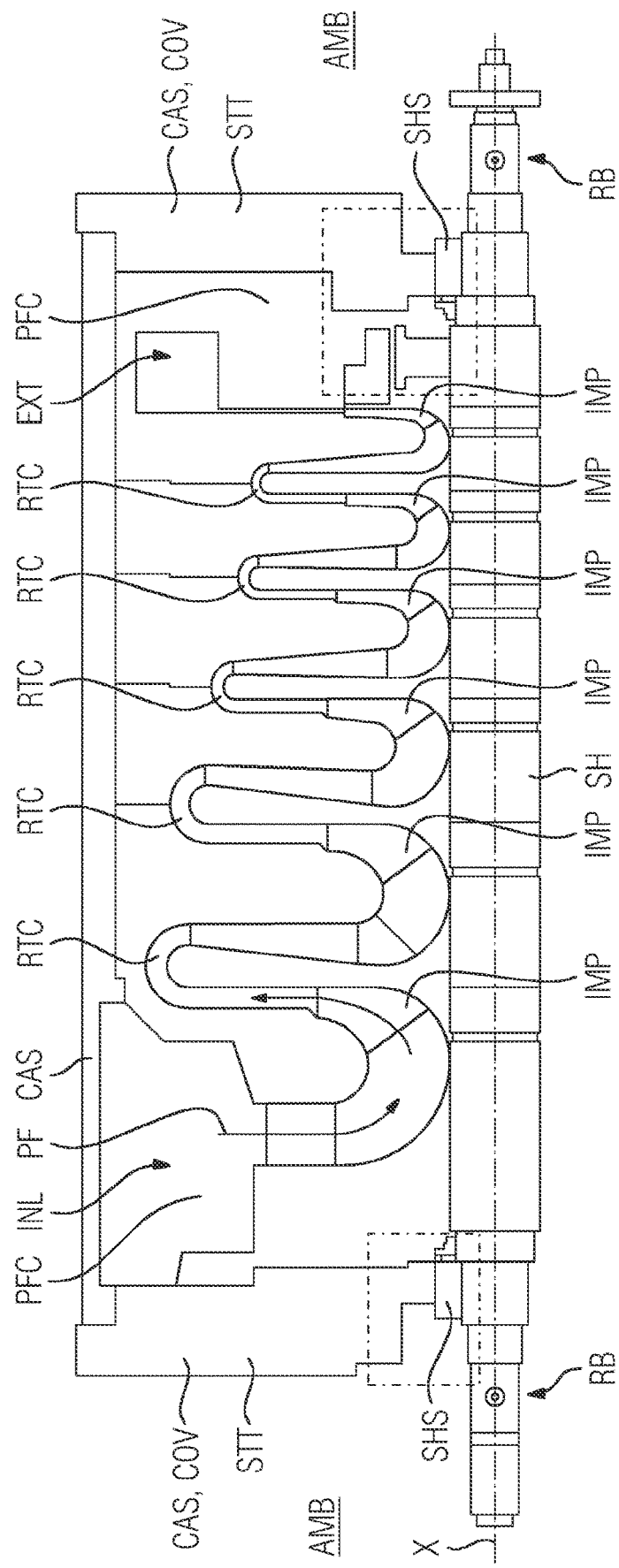
FIG. 1 shows a schematic illustration of a longitudinal section through an assembly according to the invention, specifically a turbomachine, FIGS. 2, 3 each show a schematic illustration of a shaft seal device according to the invention.

FIG. 1 shows a schematic illustration of a longitudinal section through a turbomachine TM. The turbomachine TM is designed as an assembly AR according to the invention and comprises a shaft SH, which extends along an axis X. A shaft seal device SHS for sealing an annular gap GP between the shaft SH and a stator STT is provided, in order to seal a process fluid chamber PFC relative to the environment AMB against an escape of process fluid PF. In the practical case, the stator STT is part of a housing CAS or a pressure vessel which maintains the elevated pressure relative to the environment AMB of the process fluid PF in the interior. The housing CAS has a cover COV axially on each side, which is a constituent part of the housing CAS or the stator STT. In principle, terms such as axial, radial, tangential or direction of the environment are based on the axis X of the shaft SH. The turbomachine TM of FIG. 1 is formed as a turbo compressor of radial design. In the interior of the housing CAS there are an inlet INL and an outlet EXT. In the flow path between the inlet INL and the outlet EXT, radial compressor stages in the form of impellers IMP are provided, which take in the process fluid PF axially and accelerate it radially outward. Between the individual impellers IMP there are feedback stages RTC, which deflect the process fluid from radially outward to radially inward and supply it axially to the following impeller. The shaft SH is supported by bearings RB which, here, are designed as radial bearings and keep the shaft SH in a specific radial position. An axial mounting is not depicted but is provided. On the left-hand side of the turbomachine TM in FIG. 1 there is the suction side, where the inlet INL is also located, and on the right the pressure side with the outlet EXT. Naturally, in a compressor, the pressure side is loaded by a higher pressure of the process fluid in the flow path.

Figure 2:
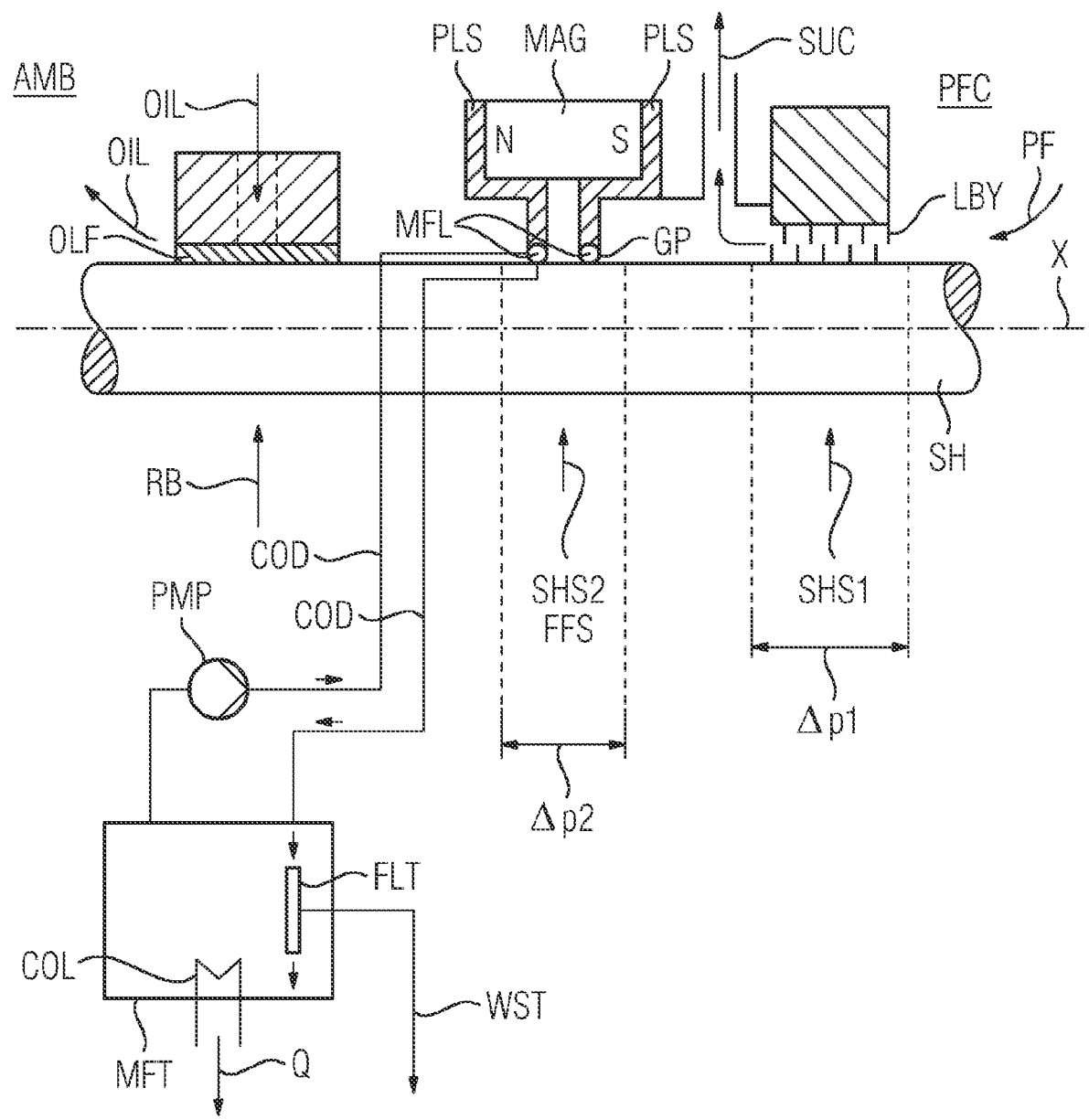
Figure 3:
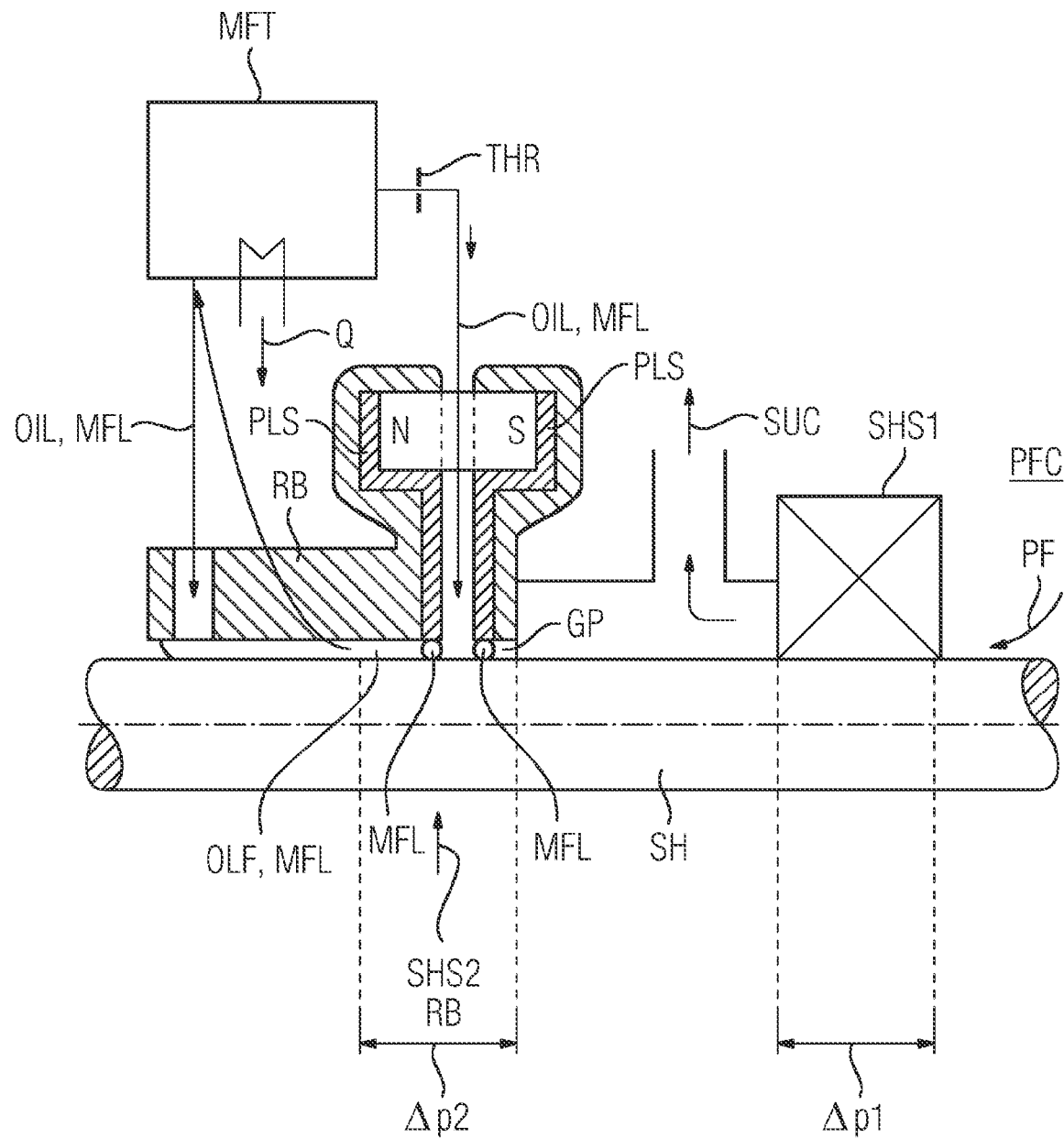

In each of FIGS. 2, 3, a schematic illustration of the shaft seal device SHS and of the bearing RB is reproduced. The schematic illustrations are restricted to a left-hand axial side of a turbomachine TM. In principle, a substantially mirror-inverted design of the right-hand side assembly is likewise possible in a turbomachine.

FIGS. 2 and 3 show a detail of the shaft SH, which extends along the axis X. The focus of the illustration is the shaft seal device SHS. The shaft seal device SHS comprises a first shaft seal SHS1 and a second shaft seal SHS2. The second shaft seal is in each case designed as a ferrofluid shaft seal FFS. The first shaft seal SHS1 can basically be any conventional shaft seal and, in FIG. 2, it is indicated by way of example as the advantageous design type of a labyrinth seal LBY. Naturally, the conventional first shaft SHS has a leak, which flows through the first shaft seal SHS1 from the interior of the process fluid chamber PFC in the direction of the environment AMB. The first shaft seal SHS1 dissipates a first pressure difference $\Delta p1$, wherein the final pressure of the first pressure difference $\Delta p1$ is determined by the pressure of a pressure sink SUC. The pressure sink SUC is advantageously connected by means of a line to the suction side or the inlet INL of the turbomachine TM. This connection is not illustrated here. The remaining second pressure difference $\Delta p2$ relative to the environment AMB is sealed by means of a second shaft seal SHS2, wherein the second shaft seal SHS2 is designed as a ferrofluid shaft seal FFS. The ferrofluid shaft seal FFS has a permanent magnet MAG which, by means of pole shoes PLS, transmits the magnetic field into the area of an annular gap GP between the ferrofluid shaft seal FFS and the shaft SH. In the gap GP, a ferrofluid MFL is provided as a constituent part of the ferrofluid shaft seal FFS. The ferrofluid MFL is kept in its place by the magnetic field generated by the permanent magnet MAG and transmitted into the area of the gap GP by means of the pole shoes PLS, so that a sealing action maintains the second pressure difference $\Delta p2$. By means of lines COD, the ferrofluid shaft seal FFS is connected to a ferrofluid storage container MFT, so that a supply and discharge of ferrofluid MFL in the region of the annular gap GP is carried out. Attached to the ferrofluid storage container MFT is a device for conditioning the ferrofluid MFL. This conditioning device comprises a filter FLT, a cooler COL, which dissipates waste heat Q, wherein the filter FLT removes the separated retentate WST from the ferrofluid MFL. In addition, the conditioning comprises a delivery of the ferrofluid MFL at a higher supply pressure by means of a pump PMP, so that circulation of the ferrofluid MFL is ensured. In the exemplary embodiment of FIG. 2, an oil-lubricated bearing RB is provided, which supports the shaft SH by means of an oil film OLF. In the usual way, the lubricant OIL of the oil film OLF is subjected to a permanent exchange for conditioning (increasing pressure, filtering, cooling . . . ).

Since the conditioning of the lubricant OIL of the bearing RB and the conditioning of the ferrofluid MFL are similar, in FIG. 3 a combination of the bearing RB and the second shaft seal SHS2 or the ferrofluid shaft seal FFS is illustrated. In the exemplary embodiment, both the ferrofluid shaft seals FFS and the bearing RB are supplied with ferrofluid MFL, which, at the same time, has the properties of the lubricant OIL. In a manner that is not illustrated, a pump, which delivers the ferrofluid MFL at a supply pressure, is provided in a conditioning unit of the ferrofluid storage container MFT. Since the supply pressure for the ferrofluid seal is lower than for the bearing RB, a throttle THR is provided in the supply line to the ferrofluid seal FFS. In principle, it is expedient to provide adjustable throttles THR in all the supply lines and to adapt the operating pressure appropriately. The second pressure difference $\Delta p2$ is then dissipated directly in the area of the bearing RB by means of the integrated ferrofluid shaft seal FFS there. Here, the annular gap GP to be sealed is a direct extension of a bearing gap of the bearing RB. This assembly ensures particular compactness, since the space required for bearing and ferrofluid seal is lower in the combination than in an individual design. At the same time, the particularly costly provision of two different operating media (lubricating oil OIL, ferrofluid MFL) has been reduced to a single operating medium (ferrofluid MFL) which, at the same time, is used as a barrier fluid and as a lubricating medium. Accordingly, FIG. 3 shows a method for operating an assembly according to the invention, wherein a bearing and a ferrofluid seal are supplied with the same operating medium in order, firstly, to maintain the lubricating film in the bearing and, secondly, to produce the barrier action of the ferrofluid seal FFS.

The invention claimed is:

1. An assembly, comprising:
   a shaft, which extends along an axis,
   a shaft seal device for sealing an annular gap between the shaft and a stator in order to seal a process fluid chamber in relation to the environment,
   wherein the shaft seal device comprises a ferrofluid shaft seal,
   wherein, at the process fluid chamber, the shaft seal device comprises a first shaft seal in addition to the ferrofluid shaft seal,
   wherein the ferrofluid shaft seal is arranged at the annular gap axially between the first shaft seal and the environment and comprises a magnet comprising a pole, and ferrofluid between the pole and a surface of the shaft,
   wherein a pressure sink is provided at the annular gap axially between the first shaft seal and the ferrofluid shaft seal,
   wherein the assembly comprises a ferrofluid storage container, in which the ferrofluid is stored, and wherein the ferrofluid storage container is connected to the ferrofluid shaft seal by a supply line and a discharge line,
   wherein the assembly comprises at least one bearing that supports the shaft via an oil film comprising the ferrofluid between the shaft and the at least one bearing, and
   wherein the assembly comprises a conditioning system that supplies the ferrofluid at a first pressure to the ferrofluid shaft seal via the supply line and that supplies the ferrofluid to the at least one bearing as a lubricant via a lubricant supply line and at a second pressure that is different from the first pressure.

2. The assembly as claimed in claim 1,
wherein the first shaft seal is designed as a labyrinth seal.

3. The assembly as claimed in claim 1,
wherein the ferrofluid comprising particles of iron and/or magnetite and/or cobalt suspended colloidally in a carrier liquid.

4. The assembly as claimed in claim 1,
wherein the assembly comprises devices for conditioning the ferrofluid.

5. The assembly as claimed in claim 4,
Wherein the ferrofluid shaft seal and a bearing of the at least one bearing are designed as a combined component.

6. The assembly as claimed in claim 4,
wherein the devices for conditioning the ferrofluid comprises a cooler and/or a filter and/or a separator.

\* \* \* \* \*